United States Patent [19]

Hroma et al.

[11] Patent Number: 5,660,295
[45] Date of Patent: Aug. 26, 1997

[54] COVERS FOR GAUGING AND SAMPLING OPENINGS

[75] Inventors: George Hroma, Oak Forest; Guy H. Johnson, Wildwood; Gerald S. Sieja, Franklin Park, all of Ill.

[73] Assignee: GPE Controls, Inc., Hillside, Ill.

[21] Appl. No.: 398,973

[22] Filed: Mar. 6, 1995

[51] Int. Cl.⁶ .................................................. B65D 45/16
[52] U.S. Cl. ...................... 220/324; 215/315; 292/256.5; 105/377.06
[58] Field of Search .................. 220/259, 324, 220/334, 315; 105/377.06, 377.07, 377.11; 292/256.5

[56] References Cited

U.S. PATENT DOCUMENTS

| | | | |
|---|---|---|---|
| 1,929,761 | 10/1933 | Thwaits | 220/334 X |
| 2,108,238 | 2/1938 | Strelow | 220/334 X |
| 2,154,545 | 4/1939 | Thwaits | 220/334 X |
| 2,183,448 | 12/1939 | Drane | 220/334 X |
| 2,324,356 | 7/1943 | Brown | 220/334 X |
| 3,118,561 | 1/1964 | Klaus | 220/324 |
| 3,173,645 | 3/1965 | Gray . | |
| 3,405,839 | 10/1968 | Saarem | 220/324 X |
| 3,519,163 | 7/1970 | Bardell . | |
| 3,532,244 | 10/1970 | Yates, Jr. . | |
| 3,567,016 | 3/1971 | Bardell . | |
| 3,618,802 | 11/1971 | Yates, Jr. . | |
| 3,638,296 | 2/1972 | Yates, Jr. . | |
| 3,677,430 | 7/1972 | Yates, Jr. . | |
| 3,696,774 | 10/1972 | Ostrem | 292/256.5 |
| 3,770,156 | 11/1973 | Yates, Jr. . | |
| 3,888,528 | 6/1975 | Jericijo | 292/256.5 |
| 4,057,020 | 11/1977 | Halliar et al. | 105/377.11 |
| 4,094,542 | 6/1978 | Siblik | 292/256.5 |
| 4,098,427 | 7/1978 | Duckworth, Jr. | 220/259 |
| 4,127,215 | 11/1978 | Morrison | 220/259 X |
| 4,293,073 | 10/1981 | Yates, Jr. . | |
| 4,570,816 | 2/1986 | Ferris et al. | 220/324 X |
| 4,889,056 | 12/1989 | Stewart | 105/377.11 |
| 5,438,935 | 8/1995 | Seitz | 220/324 X |

FOREIGN PATENT DOCUMENTS

| | | | |
|---|---|---|---|
| 2304503 | 10/1976 | France | 105/377.11 |
| 80923 | 6/1894 | Germany | 220/324 |
| 275024 | 1/1990 | Germany | 292/256.5 |
| 2200162 | 7/1988 | United Kingdom | 220/324 |

*Primary Examiner*—Allan N. Shoap
*Assistant Examiner*—Nathan Newhouse
*Attorney, Agent, or Firm*—Frank J. Uxa

[57] ABSTRACT

New covers for access openings or hatches, for example, gauge hatches, are preferably opened and closed on a "hands-free" basis, so that a human operator can carry gauging/sampling or other equipment in his/her hands and still gain access to the container to be monitored. In one embodiment, the hatch cover comprises a housing including a wall surface defining an opening, a first pivot element and a spaced apart second pivot element; a cover member coupled to the first pivot element and adapted to be pivotably movable about the first pivot element relative to the housing, the cover member being sized and adapted to cover the opening when placed in a closed position and to not cover the opening when placed in an opened position; a pin secured to the cover member; and a movable latch element coupled to the second pivot element and adapted to be pivotably movable about the second pivot element relative to the housing. The movable latch element includes a slot sized and adapted to receive the pin to at least assist in holding the cover member in the closed position.

16 Claims, 2 Drawing Sheets

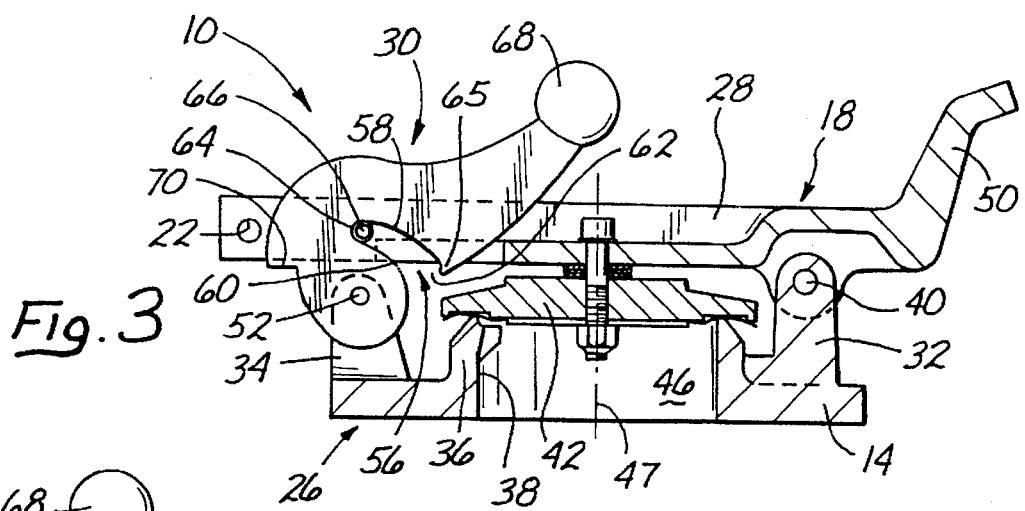
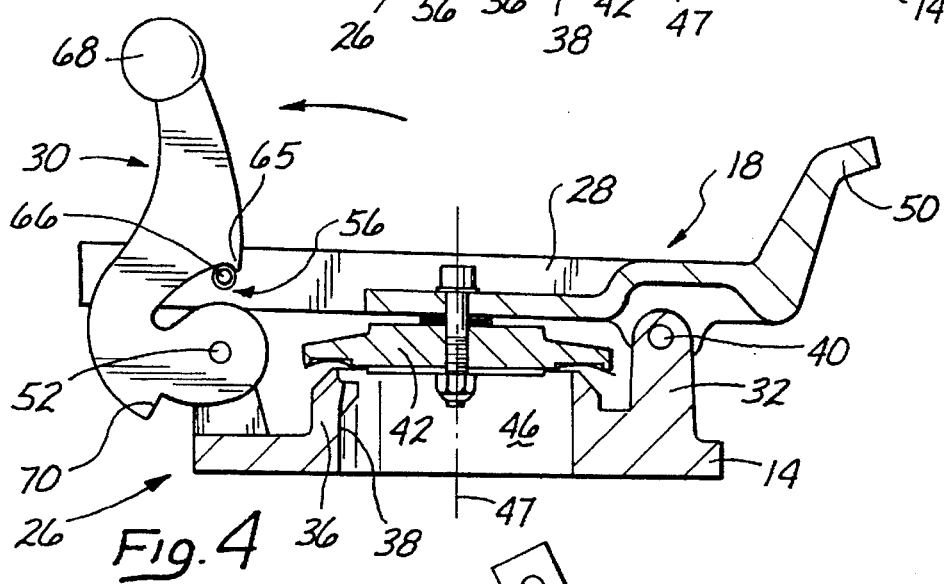
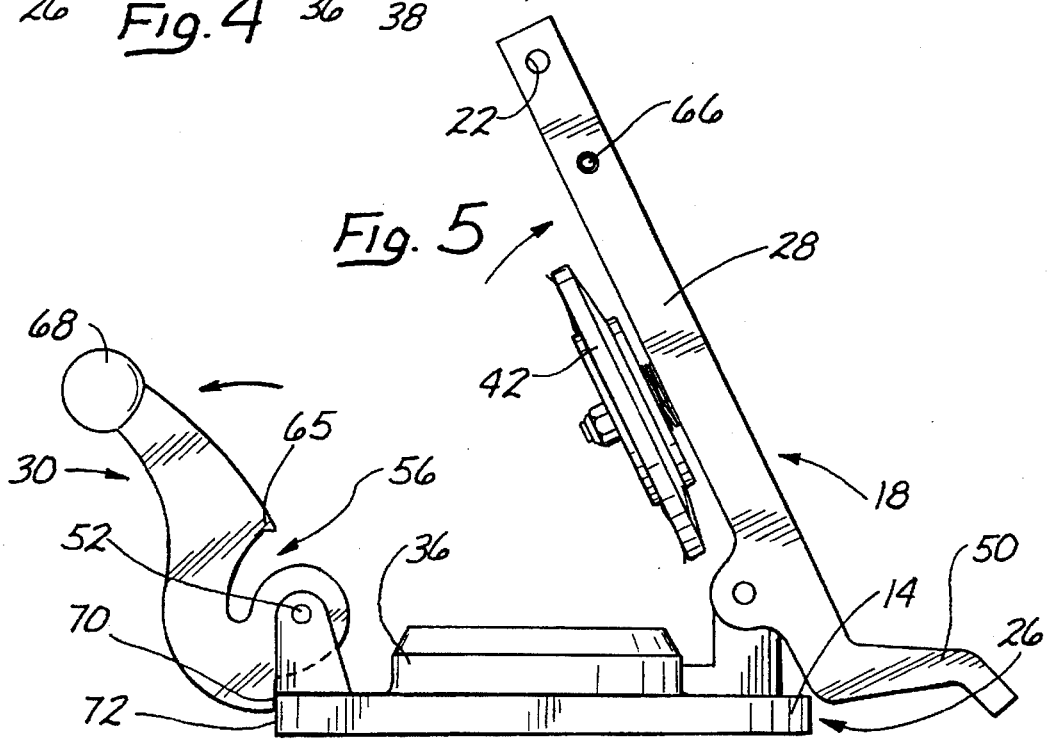

COVERS FOR GAUGING AND SAMPLING OPENINGS

BACKGROUND OF THE INVENTION

The present invention relates to covers for openings, for example, in storage tanks. More particularly, the invention relates to cover systems for openings or hatches in vessels, for example, fuel storage tanks, such as the hatches used to monitor or gauge the amount and/or quality of material in the vessel.

Storage tanks, such as gasoline or other liquid fuel tanks, are often periodically monitored to determine the amount and/or quality of the liquid present. This monitoring is performed using gauging and/or sampling and/or temperature sensing equipment, such as that which is conventional and well known in the art. This gauging and/or sampling and/or temperature monitoring is done through a relatively small (smaller than a manhole) opening or access hatch in the vessel. The human doing the gauging and/or sampling opens the access hatch, performs the desired gauging and/or sampling, and then closes the access hatch.

Opening and closing the access hatch can be very difficult because the person performing these operations also is carrying the gauging and/or sampling equipment and/or samples. This is particularly difficult with storage tanks in cold environs and/or which are used to store corrosive materials. In addition, governmental regulations relating to emissions make it even more important to properly close the access hatch after gauging and/or sampling.

Therefore, it would be advantageous to have a hatch cover system which can be easily and effectively opened and closed.

SUMMARY OF THE INVENTION

New cover systems for openings, for example, in liquid storage tanks, have been discovered. The present cover systems are structured to be easily and effectively opened and closed, for example, without requiring the operator to use his/her hands to perform these functions. Thus, the operator can carry monitoring, e.g., gauging/sampling/temperature sensing, equipment, open the access hatch equipped with a cover system in accordance with the present invention, for example, using his/her feet, perform the desired monitoring function, and then close the access hatch, again using only his/her feet. The "hands free" operation of the present cover systems is a substantial advantage, particularly in cold environs and/or when handling corrosives.

The present systems are preferably configured so that the cover is opened in a controlled and safe manner. This is particularly important when the container to be opened contains a volatile liquid, such as gasoline and the like materials. In addition, the structure of the present cover systems allows one to very easily and reliably determine when the opening is completely closed and/or sealed. This facilitates compliance with environmental emissions regulations. Further, the present cover systems can be easily and effectively locked in the closed position, rendering the storage tank and/or other container substantially tamper-proof. In short, the present cover systems provide one or more substantial advantages and represent a very significant advance over the prior art.

In one broad aspect, the present invention is directed to covers for an opening, such as hatch covers, which comprise a housing, a cover member, a pin and a movable latch element. The housing includes a wall surface defining an opening, a first pivot element and a spaced apart second pivot element. Preferably, the first and second pivot elements are positioned at opposing locations, for example, relative to the opening. The cover member is coupled to the first pivot element and is adapted to be pivotably movable, about the first pivot element relative to the housing. The cover member is sized and adapted to cover the opening when placed in a closed position, and not to cover (or leave open) the opening when placed in an opened position. The pin is secured to the cover member. The movable latch element is coupled to the second pivot element and is adapted to be pivotably movable about the second pivot element relative to the housing. The movable latch element includes a slot sized and adapted to receive the pin to at least assist in holding the cover member in the closed position.

In one useful embodiment, the movable latch element includes a notch which is sized and adapted to come into contact with the housing to limit the pivotable movement of the latch. Thus, the movable latch element is maintained at all times conveniently positioned so that it can be easily, for example, without the operator having to use his/her hands, moved from a first position, where the cover member is closed, to a second position, where the cover member is allowed to be opened, and back to the first position. The "hands-free" operation of the present cover system is substantially more difficult if the movable latch element is not restricted in its pivotable movement.

The cover member preferably includes a lever adapted to be pivotably movable about the first pivot element. This lever, which can be moved by the operator's foot, is moved about the first pivot element to place the cover member in the opened position or in the closed position, as desired, provided that the movable latch element is in the second position, as noted above.

To move the cover member to the opened position, the movable latch element is pivotably moved about the second pivot element. The pin of the cover member, which is received in the slot of the movable latch element when the cover member is in the closed position, exits the slot as the latch element is moved about the second pivot element to the second position. With the pin free of the slot, the cover member can be opened as desired, for example, to perform the gauging/sampling functions. When it is desired to close the cover member, it is placed in the closed position, and the movable latch element is moved about the second pivot element so that the pin is again received, and preferably held, in the slot.

In one particularly useful embodiment, the latch element includes a hook structure, for example, a hook or hook-like member, which is sized and adapted to restrain the pin from exiting the slot. This embodiment prevents the sudden and/or uncontrolled opening of the cover member as the latch element is being moved from the first position, (in which the latch positively holds the cover member in the closed position. For example, when the container or tank includes a quantity of volatile liquid, the vapor pressure of the liquid pushes up on the cover member urging the cover member to open very rapidly. Thus, once the latch element is moved to some extent so that the pin begins to exit the slot, the vapor pressure of the liquid in the container tends to accelerate the movement of the pin and the opening of the cover member. The hook structure, preferably located at or near the open end of the slot, acts to restrain the pin from completely exiting the slot. This feature reduces, or even substantially eliminates, the risk that the cover member will open suddenly, and possibly cause injury to the operator and/or damage to equipment. The hook structure is preferably located so that the cover member is opened to a limited extent sufficient to allow the vapor pressure in the container to at least partially equilibrate with the atmospheric pressure outside the tank. The operator can move the latch element to overcome the restraint on the pin exiting the slot. Thus, the operator has additional control on when the cover member is to be opened.

Preferably, the movable latch element includes an activator portion which extends away from the second pivot element and is adapted to facilitate the pivotable movement of the movable latch element relative to the second pivot element. The activator portion more preferably includes an enlarged structure, for example, having a ball-like configuration, located at or near the end of the movable element extending furthest away from the second pivot element.

The movable element is preferably configured so that a locking device, for example, a conventional padlock or the like device, can be used to lock the cover member in the closed position. A particularly useful construction is one in which the cover member includes at least one, preferably two, through holes positioned and adapted to receive a locking device when the cover member is in the closed position, thereby locking the cover member in the closed position.

In a useful embodiment, the housing includes a mounting flange adapted to be mounted to a container in or adjacent the passageway in the container which is to be covered. Both the first and second pivot elements are preferably secured to this mounting flange.

The opening defined by the housing is preferably circular in cross-section and, for example, has a diameter in the range of about 3 inches to about 12 inches, more preferably about 4 inches to about 10 inches. Thus, although the present covers can be adapted to cover large openings, they have particular applicability for covering openings which are substantially smaller than could be used for a human to gain access to the interior of a vessel. Thus, the present covers are particularly effective where a human operator is carrying in his/her hands equipment to be used in monitoring (from outside the vessel) the interior of a vessel. The movable latch element can be pivotably movable about the second pivot element on a "hands-free" basis. For example, the movable element can be pivotably movable using one's foot. Thus, the equipment in the operator's hands need not be dropped in order to open the cover. Also, after the monitoring operation has occurred, the operator can close the opening on a "hands-free" basis, using his/her foot to move the movable latch element so as to place the cover member in the closed position.

Methods for gaining access to the interior of a container using the presently described hatch covers are also disclosed and are within the range of the present invention.

These and other aspects and advantages of the present invention will become apparent in the following detailed description and claims, particularly when considered in conjunction with the accompanying drawings in which like parts bear like reference numerals.

BRIEF DESCRIPTION OF THE DRAWINGS

FIG. 3 is a front view, partially in cross-section, showing the hatch cover embodiment shown in FIG. 1 with the latch element in a first or closed position.

FIG. 4 is a front view, partially in cross-section, showing the hatch cover embodiment shown in FIG. 1 with the latch element in an intermediate position.

FIG. 5 is a front view showing the hatch cover embodiment shown in FIG. 1 with the latch element in a second or open position.

DETAILED DESCRIPTION OF THE DRAWING

Figure 1:
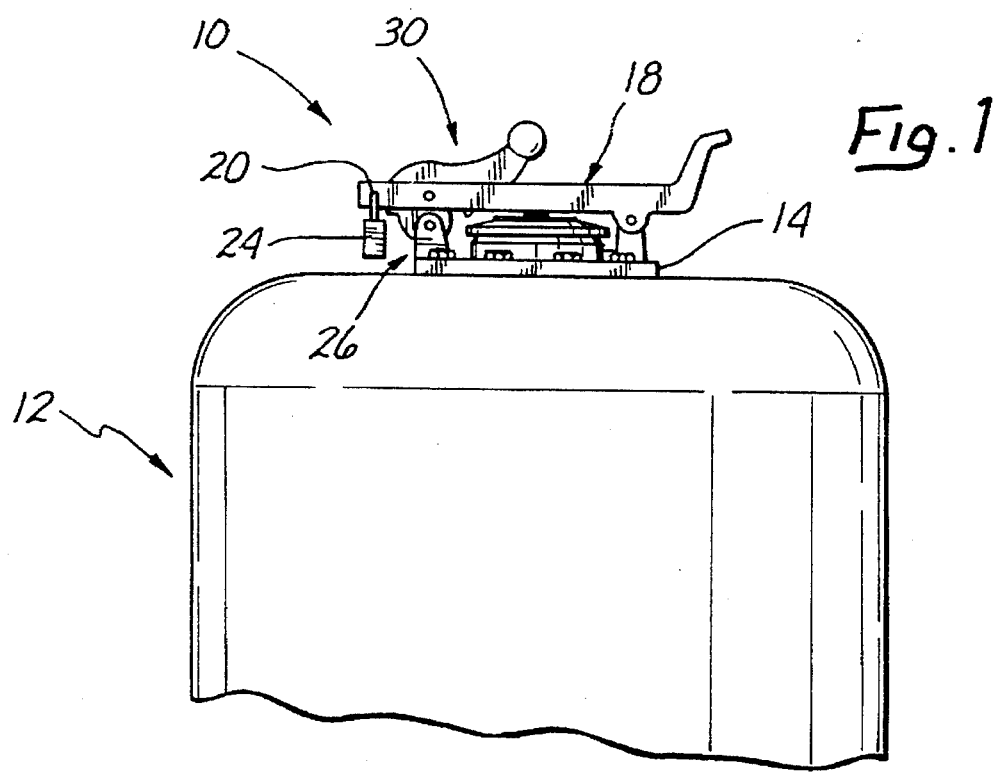
FIG. 1 is a front plan view of an embodiment of the present hatch cover shown in use mounted on a tank.
Figure 2:
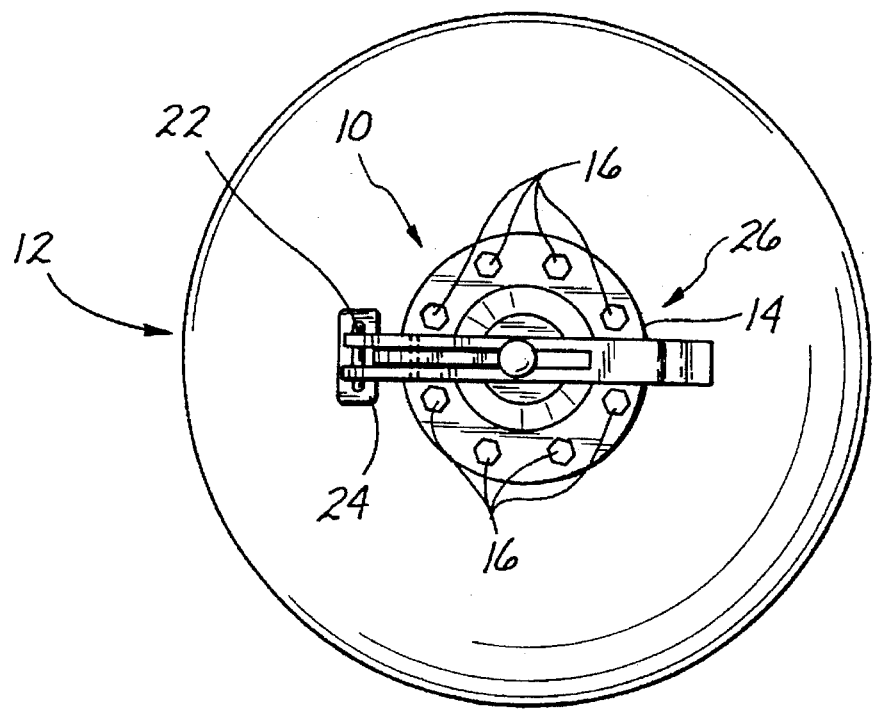
FIG. 2 is a top plan view of the hatch cover embodiment shown in FIG. 1.

Referring now to the drawings, FIGS. 1 and 2 illustrate a hatch cover in accordance with the present invention, shown generally at 10, in use on a gasoline storage tank 12. Match cover 10 includes a mounting flange 14 with a series of eight (8) holes through which bolts 16 are placed to mount the hatch cover to the storage tank 12. In addition, hatch cover 10 includes a cover and arm assembly 18, a housing 26 and a latch assembly 30. Match cover 10 can be made of any suitable material or combination of materials of construction, such as, for example, aluminum, steel, 316 stainless steel and the like.

As shown in FIGS. 1 and 2, hatch cover 10 is positioned so as to seal or cover or secure the interior of the tank 12 from the atmosphere. Moreover, the cover and arm assembly 18 of the hatch cover 10 includes a cross bar element 28 having through holes 20 and 22 through which padlock 24 is placed so as to lock the cover and arm assembly 18 in a position which seals the interior of tank 12 from the outside atmosphere. This is the configuration which normally would be employed when hatch cover 10 is not being employed to gain access to the interior of storage tank 12. In order to gain access to the interior of tank 12 through hatch cover 10, it is necessary to remove padlock 24 from through holes 20 and 22.

The description of FIGS. 3, 4 and 5 assumes that padlock 24 has been removed from through holes 20 and 22.

Housing 26, as shown in FIG. 3, includes mounting flange 14, first pivot element 32, second pivot element 34 and central axially extending portion 36, which includes wall surface 38, defining the opening 46 which is to be covered. The opening to be covered may have any suitable cross-sectional (transverse to the longitudinal axis 47 of housing 26) shape or configuration. For example, opening 46 is circular in cross-section and has a diameter of about 6 inches. The opening may be somewhat different, e.g., smaller, in size than the passageway through the wall of tank 12. Access to the interior of tank 12 is gained by passing through the opening 46 and the passageway in the wall of tank 12.

Cover and arm assembly 18 is coupled to and pivots about first pivot element 32 around first pivot pin 40. Thus, cover and arm assembly 18 is coupled to housing 26 at first pivot element 32.

Cover and arm assembly 18 includes a cover 42 which comes in contact with axially extending portion 36 when it is desired to close opening 46. Cover and arm assembly 18 includes an arm 50 which is configured to be moved so as to pivotably move the cover and arm assembly when it is desired to open or close opening 46. Arm 50 is structured so as to be easily and conveniently moved by the foot of a human operator.

Latch assembly 30 is coupled to housing 26 at second pivot element 34. Latch assembly 30 is pivotably movable relative to housing 26 about second pivot pin 52. Latch assembly 30 includes a slot, shown generally at 56, which is defined by cam surface 58 and interior surface 60. Slot 56 includes an open end 62 and a closed end 64. In addition, cam surface 58 includes a hook structure 65 located at the open end 62 of slot 56.

Slot 56 is configured to receive and hold pin 66, which is secured to cover and arm assembly 18, in particular to cross bar element 28. When cover and arm assembly 18 is in the first or closed position (as shown in FIG. 3), pin 66 is substantially aligned (in a direction parallel to longitudinal axis 47) with second pivot pin 52. As shown in FIG. 3, pin 66 (located at the closed end 64 of slot 56) is directly above second pivot pin 52. This "aligned" relationship between the pin 66 and second pivot pin 52 facilitates maintaining the latch assembly 30 and the cover and arm assembly 18 in the closed position, as shown in FIG. 3.

A ball structure 68 is located on the end of latch assembly 30 extending away from second pivot pin 52. Ball 68, together with the general configuration of latch assembly 30, facilitates the movement of the latch assembly relative to the housing 26. In addition, latch assembly 30 includes a notch surface 70 which functions as described hereinafter.

The operation of hatch cover 10 is illustrated as follows. As shown in FIG. 3, hatch cover 10 is positioned so as to seal opening 46. Cover 42 is in contact with axially extending portion 36. The padlock 24 has been removed from the through holes 20 and 22 located in cross bar element 28 so that the latch assembly 30 can be moved from the closed position (FIG. 3) to the open position (FIG. 5). A human operator, carrying gauging and/or sampling and/or temperature sensing equipment in his hands, approaches hatch cover 10 and, with his foot, moves latch assembly 30 to the left, as shown in FIG. 4. This causes pin 66 to move away from the closed end 64 of slot 56. The vapor pressure of the liquid gasoline in tank 12 causes the cover 42 to unseat from axially extending portion 36 to a limited extent. This causes some vapor from the interior of storage tank 12 to pass through opening 46 to the atmosphere outside of tank 12.

As pin 66 moves away from closed end 64 of slot 56, it rides or is in contact with cam surface 58. Hook structure 64 on cam surface 58 captures or restrains pin 66 from passing completely out of slot 56. Thus, in this intermediate position, as shown in FIG. 4, the vapor pressure in tank 12 is allowed to equilibrate with the atmospheric pressure outside of the tank so that the cover 42 does not suddenly, violently and uncontrollably burst open. After this equilibration has occurred, the human operator can, by positively moving, e.g., kicking, the latch assembly 30 further to the left, as shown in FIG. 5, overcome the restraint caused by the hook structure thereby releasing the pin 66 from slot 56. The extent of the movement of latch assembly 30 to the left, as shown in FIG. 5, is restricted because notch surface 70 comes in contact with side surface 72 of mounting flange 14. Thus, in the extreme position as shown in FIG. 5, movable latch element is still conveniently available (for hands-free operation) to close the cover and arm assembly 18, when such closure is desired.

With latch assembly 30 positioned as shown in FIG. 5, the human operator can step on arm 50 to open the cover and arm assembly 18 so that the operator can have access through opening 46 to the interior of tank 12, for example, for gauging and/or sampling and/or temperature sensing purposes.

Once all the measurements and/or sampling in the interior of tank 12 have been completed, the hatch cover 10 can be closed as follows. The cover and arm assembly 18 is placed back in the closed position so that cover 42 is in contact with the axially extending portion 36. Latch assembly 30 is moved to the right from the position shown in FIG. 5 so that slot 56 captures pin 66 and holds it at the closed end 64 of the slot. If desired, padlock 24 can be passed through holes 20 and 22 to lock latch assembly 30 in place with cover 42 sealing or securing opening 46.

The above procedure can be carried out as many times as necessary in order to properly monitor the contents in the interior of tank 12.

The present hatch covers very effectively seal container interiors from the atmosphere. The positive movement of the latch assembly provides additional assurance that the hatch is properly sealed. These hatch covers have an important advantage in being operable in a "hands-free" mode. This enhances the ability of the operator to perform the necessary monitoring functions while reducing the risk of injury and/or damage to the monitoring equipment. The hatches are opened in a controlled manner which provides enhanced operational safety. Moreover, the present hatch covers can be easily and effectively locked, making the contents of the container substantially tamper proof.

While this invention has been described with respect to various specific examples and embodiments, it is to be understood that the invention is not limited thereto and that it can be variously practiced within the scope of the following claims.

What is claimed is:

1. A cover comprising:
   a housing includes a longitudinal axis, a wall surface defining an opening, a first pivot element, a spaced apart second pivot element and a non-pivotal, stationary support for said second pivot element;
   a cover member coupled to said first pivot element and being pivotably movable about said first pivot element relative to said housing, said cover member being sized to cover said opening when placed in a closed position and to not cover said opening when placed in an opened position;
   a pin secured to said cover member; and
   a movable latch element coupled to said second pivot element and being pivotably movable about said second pivot element relative to said housing, said movable latch element including a slot sized to receive said pin to at least assist in holding said cover member in said closed position, said second pivot element and said pin being aligned parallel to and equal distance from said longitudinal axis with said cover member in said closed position.

2. The cover of claim 1 wherein said first and second pivot elements are positioned at substantially opposing locations relative to said opening.

3. The cover of claim 1 wherein said movable latch element includes a notch which is sized to come into contact with said housing to limit the pivotable movement of said movable latch element.

4. The cover of claim 1 wherein said cover member includes a lever pivotably movable about said first pivot element to place said cover member in said opened position or in said closed position, said lever extending radially outwardly of said first pivot element.

5. The cover of claim 1 wherein said slot has an elongated cam surface positioned so that said pin is in contact with and moves in said slot along said cam surface as said movable latch element is moved relative to said housing with said cover member initially in said closed position, and said movable latch element includes a hook structure sized to restrain said pin from exiting said slot.

6. The cover of claim 5 wherein said slot has an open end and a closed end, said hook structure is located near said open end and said pin is located at said closed end to at least assist in holding said cover member in said closed position.

7. The cover of claim 5 wherein said movable latch element is movable to overcome the restraint on said pin exiting said slot.

8. The cover of claim 1 wherein said movable latch element includes an activator portion which extends away from said second pivot element to facilitate the pivotable movement of said of movable latch element relative said housing.

9. The cover of claim 8 wherein said activator portion includes an enlarged structure located at or near the end of said movable latch element extending furthest away from said second pivot element.

10. The cover of claim 9 wherein said enlarged structure has a ball-like configuration.

11. The cover of claim 1 wherein said housing includes a mounting flange mountable to a container in or adjacent a passageway in the container.

12. The cover of claim 11 wherein said first pivot element and said second pivot element are both secured to said mounting flange.

13. The cover of claim 1 wherein said housing includes an axially extending component which carries said wall surface, and said cover member includes a cover element adapted to contact said axially extending component when said cover member is in said closed position.

14. The cover of claim 1 wherein said opening is circular in cross-section and has a diameter in the range of about 3 inches to about 12 inches.

15. The cover of claim 1 wherein said cover member includes at least one through hole positioned and adapted to receive a locking device when said cover member is in said closed position, thereby locking said cover member in said closed position.

16. The cover of claim 1 mounted on a tank containing volatile liquid.

* * * * *